United States Patent [19]

Ravet

[11] 3,994,660

[45] Nov. 30, 1976

[54] MOLDING MACHINE

[75] Inventor: Christian Ravet, Givors, France

[73] Assignee: Fives-Cail Babcock, Paris, France

[22] Filed: Feb. 28, 1975

[21] Appl. No.: 554,207

[30] Foreign Application Priority Data

Mar. 8, 1974 France .............................. 74.07925

[52] U.S. Cl. .................................. 425/432; 425/456

[51] Int. Cl.² ...................... B29C 1/00; B29C 11/00; B28B 1/08

[58] Field of Search ........... 425/421, 422, 456, 432, 425/425

[56] References Cited

UNITED STATES PATENTS 3,419,649 12/1968 Livingston et al. ................. 425/425

3,824,060 7/1974 Helmrich et al. ................... 425/425

*Primary Examiner*—Francis S. Husar
*Assistant Examiner*—R. J. Charvat
*Attorney, Agent, or Firm*—Kurt Kelman

[57] ABSTRACT

Carbon electrodes for the aluminum industry are shaped in a vibrating mold whose horizontal oscillations are restrained by tension members elongated in a horizontal direction and interposed between the vibrating mold and its stationary supporting structure to exert opposed forces on the mold in a common horizontal plane, thereby impeding horizontal vibration of the mold while permitting vibration in a vertical direction.

12 Claims, 7 Drawing Figures

MOLDING MACHINE

This invention relates to molding machines, and particularly to a molding machine in which a mold is mounted on a support and provided with a vibrator for vibrating the mold relative to the support.

The invention will be described hereinafter with reference to a mold employed for shaping carbon electrodes for the aluminum industry, but the problems of such a machine are encountered in other applications, and it will be understood that the material to be molded is not in itself a part of this invention.

In machines of the type outlined above, horizontal vibrations of the mold are undesirable. They are avoided in conventional machines by arranging the molds between upright columns or slides which guide vertical mold oscillations, but absorb horizontal forces. the known guide elements are subject to rapid wear because of frictional engagement by the moving mold assembly under heavy contact pressure.

A primary object of this invention is the provision of a molding machine in which the mold is restrained to oscillate predominantly in a vertical direction, but which is not subject to wear due to frictional engagement of the mold with stationary machine elements.

With this object and others in view, as will hereinafter become apparent, the invention provides a molding machine in which a mold is mounted on a stationary support and a vibrating device vibrates the mold relative to the support during normal operation of the machine. Horizontal vibration of the mold is impeded selectively by a restraining arrangement which includes several tension members interposed between the support and the mold. The tension members are elongated in a horizontal direction and exert opposed forces on the mold in a common horizontal plane.

Other features and many of the attendant advantages of this invention will readily be appreciated as the same becomes better understood from the following detailed description of a preferred embodiment and of variations thereof when considered in connection with the appended drawing in which.

Figure 4:
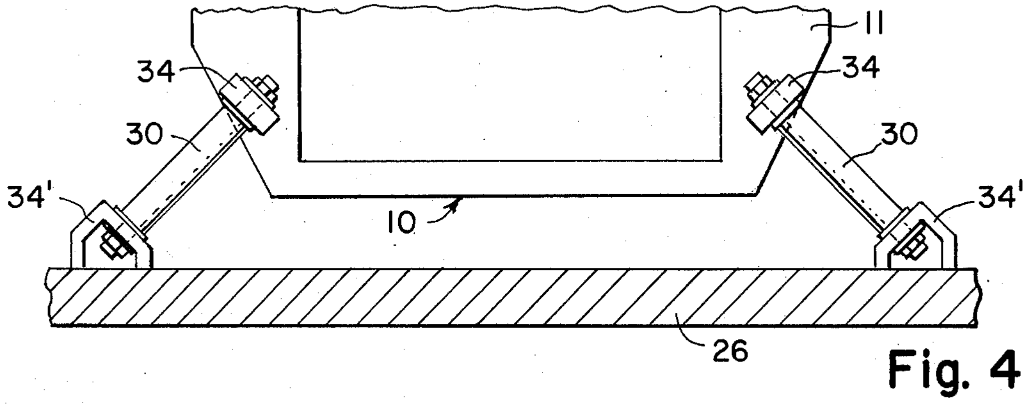
FIG. 4 shows a modification of the device of FIG. 2.
Figure 5:
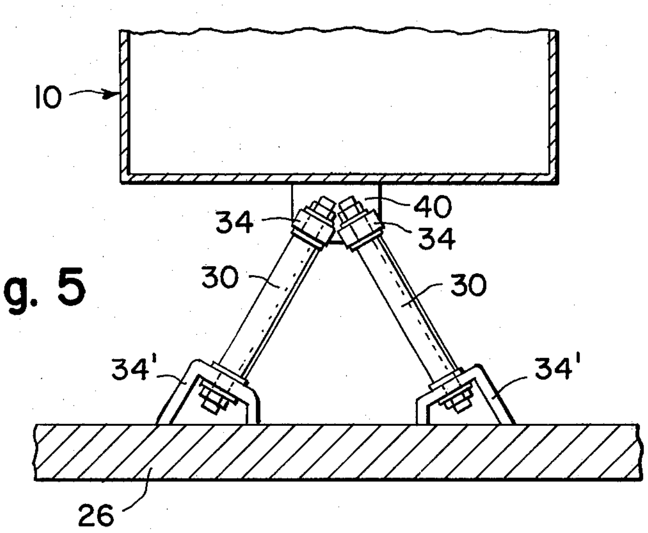
FIG. 5 illustrates a modification of the device of FIG. 3.
Figure 7:
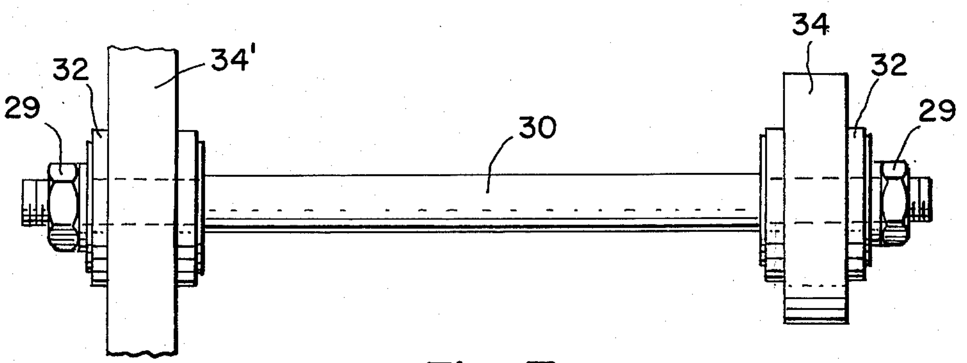

FIG. 7 similarly illustrates an element common to FIGS. 4 and 5.

Figure 1:
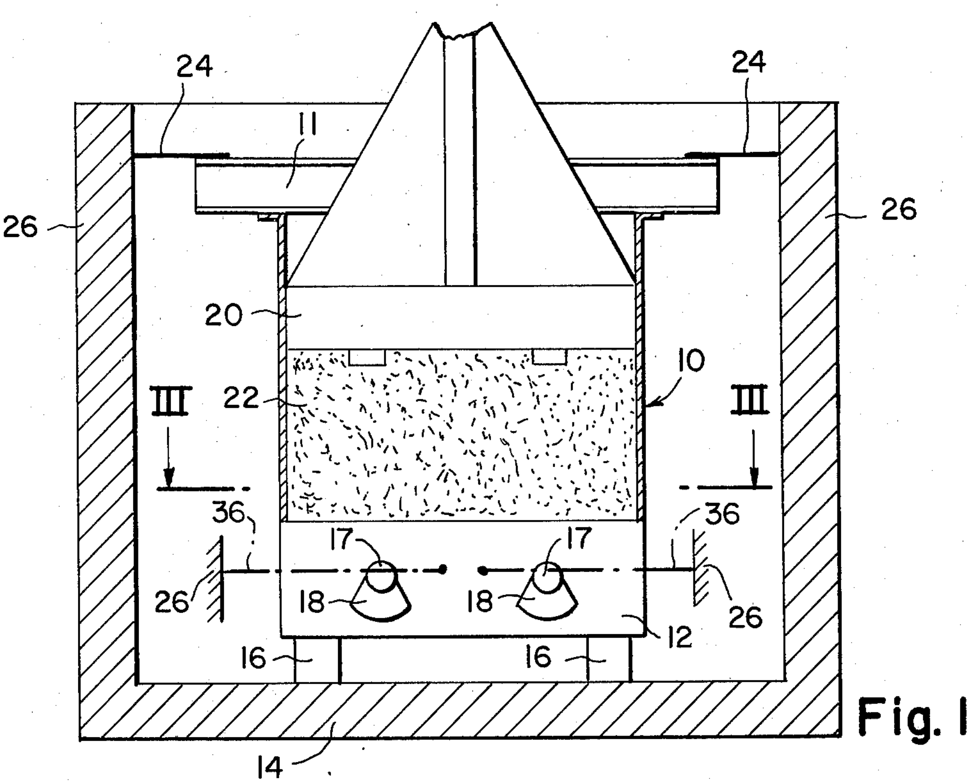
FIG. 1 shows a molding machine of the invention in front elevation and partly in section.

Referring now to the drawing in detail, and initially to FIG. 1, there is shown an upwardly open mold 10 whose walls are offset at right angles to each other and which is reinforced by a flange 11 of I-beams about its open top. The mold 10 is fixedly mounted on a vibrating table 12 which in turn is supported on a stationary supporting base 14 by means of rubber blocks or springs 16. Two shafts 17 carry eccentric weights 18, and are rotated by a motor obscured by the table 12 to vibrate the mold 10. The structure described so far is conventional and functions in a conventional manner to exert oscillating vertical and horizontal forces on the mold 10. The known structure also includes a heavy cover 20 dimensioned for vertical sliding movement in the open top of the mold 10 and resting on the particulate material 22 which occupies the mold cavity.

In addition to the base 14, the supporting structure of the machine includes a heavy upright wall 26 which surrounds the mold 10 and the vibrating table 12 and rises beyond the flange 11 on two sides of the mold 10. Cables 24 are interposed between portions of the rectangular flange 11 contiguously adjacent the four upright edges of the mold 10 and the wall 26, as is better seen in FIG. 2.

Figure 2:
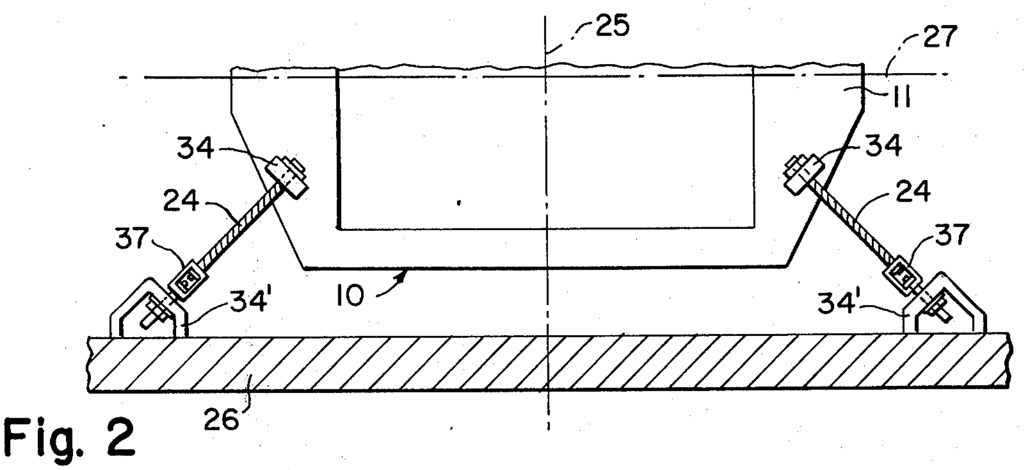
FIG. 2 is a fragmentary, enlarged, top plan view of the apparatus of FIG. 1.

Because of its rectangular shape, the mold 10 has two upright median planes of symmetry 25, 27 perpendicular to each other, and the four cables 24 are arranged symmetrically with respect to each of the planes 25, 27 in a common horizontal plane. Only two cables 24 are seen in FIG. 2, and it will be understood that the portion of the apparatus omitted from FIG. 2 is a mirror image of the illustrated part. The cables 24 are under slight tension in the idle condition of the apparatus and the illustrated cables thus exert a horizontal force on the mold 10 which is opposed to the corresponding force exerted by the non-illustrated cables. The wall 26 also carries the hoist for the cover 20, as is not specifically illustrated.

Figure 6:
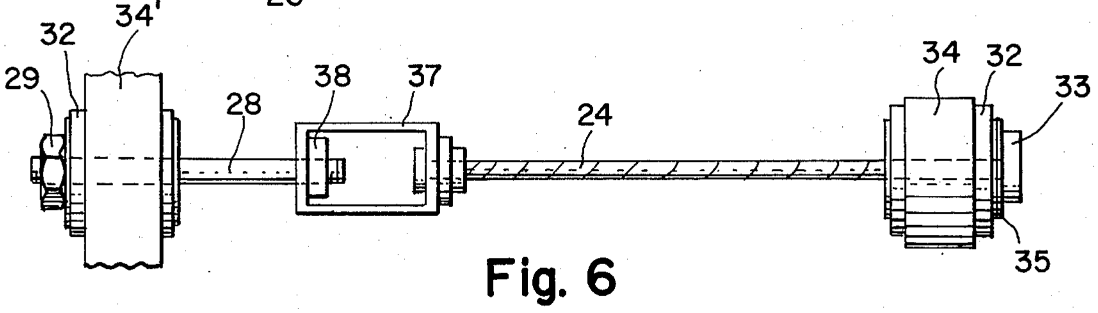
FIG. 6 shows an element common to FIGS. 2 and 3 on larger scale.

One of the cables 24 and associated elements are shown in FIG. 6 on a larger scale. One end of the cable passes through a lug 34 on the flange 11 and prevents vertical movement of the cable which carries a retaining anchor 33 and a washer 35 on its free end. A silencer pad 32 of rubber is interposed between the washer 35 and the lug 34. A turnbuckle 37 is freely rotatable on the other end of the cable 24 and threadedly engages one end of a rod 28 which is secured by a locking nut 38. The other end of the rod 28 is similarly secured against vertical movement by a lug 34' on the wall 26. A nut 29 on the rod 28 buts against a silencer pad 32 interposed between the nut and the lug 34'. The effective length of the cable 24, and thus its tension may be adjusted by turning the nut 29 and/or the turnbuckle 37 on the rod 28, and the effective length and tension of each of the four cables should be identical for best results.

Figure 3:
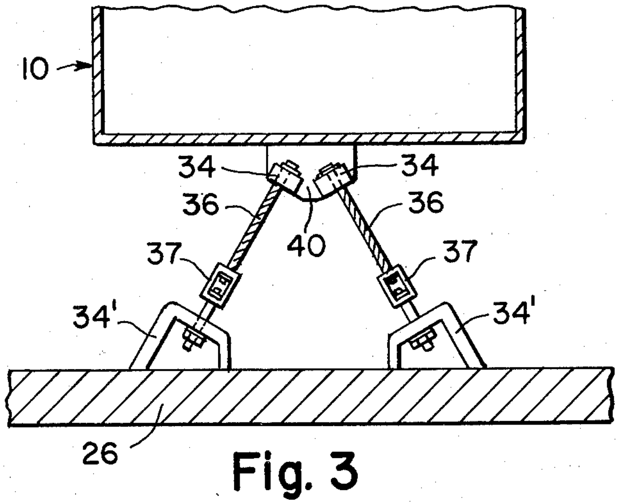
FIG. 3 shows the apparatus of FIG. 1 in fragmentary section on the line III—III.

The lower end of the mold 10 is secured to the wall 26 by four cables 36 in a manner indicated only diagrammatically in FIG. 1, but better seen in FIG. 3. A bracket 40 centrally mounted on the front and rear walls of the mold 10 near its bottom carries two lugs 34 from which respective cables 36 diverge toward horizontally aligned fastening lugs 34' on the wall 26 in a manner described more fully above with reference to FIG. 2.

The rubber pads 32 associated with each cable 24 permit angular displacement of the cables relative to the mold 10 and the wall 26 during vertical oscillation of the mold 10. The extent to which horizontal oscillations are suppressed depends on the balancing of the four cable assemblies in their horizontal planes. If the four cables are identical in length and tension, no horizontal movement of the mold 10 occurs, yet adequate vertical movement is possible due to elastic deformation of the cable assemblies in tension.

The cables 24 may be replaced by more rigid rods 30 in otherwise identical or analogous arrangements, as is shown in FIGS. 4, 5, 7. Because the rods 30 are capable of transmitting not only tensile stresses, but also compressive stresses, it would be sufficient to provide only two rods 30 on each level, but four are presently preferred.

While different arrangements of tension members have been shown in the drawing on respective horizontal levels, the four cables 24 on the bottom level of the mold 10 may be arranged in the manner shown in FIG. 2 or the cables on the top level may be arranged as is seen in FIG. 3. Actually, a single set of cables, preferably on or near the top level of the mold is sufficient. Cables and relatively rigid rods may be combined in the same machine if so desired, and the arrangement of the tension members on two levels may be identical or different.

It should be understood, therefore, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. A molding machine comprising:

a. a stationary support;

b. a mold mounted on said support;

c. vibrating means operatively connected to said mold for vibrating said mold relative to said support; and d. restraining means for selectively impeding horizontal vibration of said mold while permitting vibration of said mold in a vertical direction, said restraining means including a plurality of tension members elongated in a horizontal direction, respective longitudinal end portions of each tension member being secured to said support and to said mold against relative vertical movement, said tension members being positioned to exert opposed forces on said mold in a horizontal plane.

2. A machine as set forth in claim 1, wherein said restraining means include an additional set of tension members elongated in a horizontal direction, the tension members of said additional set being interposed between said support and said mold for exerting opposed forces on said mold in an additional horizontal plane vertically spaced from said common plane.

3. A machine as set forth in claim 1, wherein said tension members are tensioned cables.

4. A machine as set forth in claim 3, wherein said cables are four in nummber, said cables being substantially identical and being elongated in said common plane, respective pairs of said cables being elongated in two directions, said mold having two intersecting upright median planes, and said cables being arranged symmetrically relative to said planes.

5. A machine as set forth in claim 1, wherein said tension members include two sets of four cables each, said tension members being cables, the cables of each set being elongated in a common horizontal plane vertically spaced from the plane of the other set, said mold having two angularly offset, upright, median planes, and the cables of each set being symmetrical with respect to each of said planes.

6. A machine as set forth in claim 1, wherein said tension members are cables, said machine further comprising means for adjusting the tension in at least one of said cables.

7. A machine as set forth in claim 1, wherein said mold has four upright walls offset at right angles from each other and defining four upright edges, said tension members being secured to said mold contiguously adjacent respective ones of said edges.

8. A machine as set forth in claim 1, wherein said mold has two parallel upright walls and an upright median plane bisecting each of said walls, two of said tension members being secured to said walls respectively contiguously adjacent said median plane.

9. A machine as set forth in claim 1, wherein said restraining means further include a body of elastomeric material operatively interposed between the ends of said tension members and said mold and said support.

10. A machine as set forth in claim 1, wherein said tension members are rigid rod members, said end portions thereof being secured to said support and to said mold for relative angular movement.

11. A machine as set forth in claims 1, wherein said tension members include two identical rigid rods, said end portions of each rod being secured to said support and to said mold respectively for relative angular movement, said rods being elongated in a commmon horizontal plane, said mold having an upright median plane, said rods being symmetrically arranged relative to said median plane.

12. A machine as set forth in claim 1, wherein said tension members include two pairs of rigid rods, said end portions of each rod being secured to said support and to said mold respectively for relative angular movement, the rods of each pair being elongated in a common horizontal plane vertically spaced from the plane of elongation of the other pair, said mold having an upright median plane, the rods of each pair being arranged symmetrically relative to said median plane.

* * * * *